(12) United States Patent
Brunner et al.

(10) Patent No.: US 7,693,822 B2
(45) Date of Patent: Apr. 6, 2010

(54) APPARATUS OF GENERATING BROWSING PATHS FOR DATA AND METHOD FOR BROWSING DATA

(75) Inventors: Jean-Sebastien Brunner, Beijing (CN); Li Ma, Beijing (CN); Yue Pan, Beijing (CN); Lei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 11/751,181

(22) Filed: May 21, 2007

(65) Prior Publication Data

US 2008/0027932 A1 Jan. 31, 2008

(30) Foreign Application Priority Data

Jul. 27, 2006 (CN) .................. 2006 1 0107893

(51) Int. Cl.
*G06F 17/30* (2006.01)
(52) U.S. Cl. .......................... 707/2; 707/102
(58) Field of Classification Search ................ None
See application file for complete search history.

(56) References Cited

U.S. PATENT DOCUMENTS

| | | | |
|---|---|---|---|
| 6,519,586 B2* | 2/2003 | Anick et al. .................... 707/3 |
| 6,622,139 B1 | 9/2003 | Nakayama et al. |
| 2004/0044661 A1* | 3/2004 | Allen et al. .................... 707/3 |
| 2005/0084136 A1 | 4/2005 | Xie et al. |
| 2007/0118542 A1* | 5/2007 | Sweeney ..................... 707/100 |
| 2007/0255745 A1* | 11/2007 | Gargi ......................... 707/102 |

FOREIGN PATENT DOCUMENTS

JP 2005208793 8/2005

OTHER PUBLICATIONS

"Publishing Museum Collections on the Semantic Web—The Museum Finland Portal" by Eero Hyvönen et al, WWW conference 2004.
"Faceted Metadata for Image Search and Browsing" by Lee et al, Proceedings of CHI 2003, vol.No. 5, Issue No. 1,pp. 401-408.
"Introduction to Algorithms, Second Edition", by Thomas H. Cormen, Charles E. Leiserson, Ronald L. Rivest, and Clifford Stein, published by The MIT Press, 2001.
Survey of Clustering Data Mining Techniques by Pavel Berkhin, 2002 Accrue Software, 56 pages.

* cited by examiner

*Primary Examiner*—Tim T. Vo
*Assistant Examiner*—Aaron Sanders
(74) *Attorney, Agent, or Firm*—Yuanmin Cai

(57) ABSTRACT

The present invention provides a method and apparatus of generating browsing paths for data, a method for browsing data and a computer program product. According to one aspect of the invention, there is provided a method of generating browsing paths for data. Firstly, a plurality of candidate browsing paths based on a data model describing the data structure is generated; next for each of the plurality of candidate browsing paths, importance of the browsing path based on a portion of data corresponding to the browsing path in the data is calculated; and at least one of the plurality of candidate browsing paths based on the importance is selected.

18 Claims, 10 Drawing Sheets

Results for ibm                                                                                           Results Search History now includes Froogle. Learn more.

| Category | Price range | Brands | Stores | Seller rating | Or refine by... |
|---|---|---|---|---|---|
| Computers | Under $800 | IBM | BatteryForAll | 4 stars and up | Capacity (GB) |
| Notebooks | $800 - $1,400 | Lenovo | Buy.com | 3 stars and up | GHz |
| Computers | $1,400 - $2,000 | | eBatts.com | 2 stars and up | |
| | $2,000 - $4,000 | | NexTag Stores | Has a rating | |
| | Over $4,000 | | Super Warehouse | More » | |
| | $ [ ] to $ [ ] [Go] | | More » | | |

Show grid view - Ungroup products  [Sort by relevance ▼]

prior art

Fig 1

Search results for products

Product hierarchy
- Computer
  - Desktop (123)
  - Laptop (123)
- Software (120)

SoldIn (store) – Hierarchy
- Internet store (400)
- Physical store
  - Supermarket (160)
  - Department store (123)

Year of release
- 2002 (200)
- 2003 (230)
- 2004 (253)

SoldIn (store) – Accepting Card (card)
- Visa (450)
- Mastercard (200)

Fig 7

APPARATUS OF GENERATING BROWSING PATHS FOR DATA AND METHOD FOR BROWSING DATA

CROSS-REFERENCE TO RELATED APPLICATIONS

The present application claims the benefit of priority of a Chinese Patent Application No. 200610107893.5 filed Jul. 27, 2006 in the State Intellectual Property Office of the People's Republic of China, the content of which is incorporated herein by reference in its entirety.

TECHNICAL FIELD OF THE INVENTION

The present invention relates to information processing technology and, in particular, to the technology of generating browsing path for data and browsing data.

BACKGROUND OF THE INVENTION

Recently, the facet search or facet browsing has become a popular paradigm to browse large collections of semi-structured or structured data representing business objects (such as products, documents, companies, etc.). This paradigm lies in organizing the business objects in orthogonal category taxonomies called facets, for example, it is disclosed in the article "Publishing Museum Collections on the Semantic Web—The Museum Finland Portal" by Eero Hyvönen et al, WWW conference 2004, and in the article "Faceted metadata for image search and browsing" by Lee, K.-P., K. Swearingen, K. Li & M. Hearst, Proceedings of CHI 2003, all of which are incorporated herein by reference. In the disclosed techniques, users can easily express their queries by selecting and combining different categories within the given facets and refine their queries step by step until reaching a satisfactory set of solutions.

FIG. 1 shows one example of a prior art facet browsing. In FIG. 1, a user enters a query "ibm", the resulting categories include a plurality of facets, for example, categories, price ranges, brands, stores and seller rating, etc., these facets and the order of which are all predefined. There are a number of categories corresponding to each browsing path, for example, the price ranges include under $800, $800-$1400, $1400-$2000, $2000-$4000, over $4000, or the user can input his or her own price range.

Usually, facet search is based on a predefined (manual) selection of a limited number of facets. This method was satisfying within a limited scope, it can not be dynamically applied to new or updated business objects. Actually, the business objects can often be dynamically created or updated by external users (partners) and be composed of a large number of properties or relationships, which can create hundreds or even more potential facets.

Additionally, facets are usually defined as simple features of the objects. The notion of browsing path, more generic than facet, which includes facets and complex facets obtained by composing several features of the objects.

Therefore, predefining browsing paths and their corresponding categories to browse the data becomes cumbersome and may not reflect the current change of objects. On the contrary, the automatic listing of all possible browsing paths will be confusing for users, the user can not find one or several browsing paths he needs from a large number of browsing paths, and can not make a smooth navigation.

SUMMARY OF THE INVENTION

In order to solve the above problems in the prior art, the present invention provides a method and apparatus of generating browsing paths for data, a method for browsing data and a computer program product, so that for semi-structured or structured data, automatic selection of optimized browsing paths can be implemented. According to one aspect of the invention, there is provided a method of generating browsing path for data, comprising: generating a plurality of candidate browsing paths based on a data model describing the structure of the data; for each of the plurality of candidate browsing paths, calculating importance of the browsing path based on a portion of data corresponding to the browsing path in the data; selecting at least one of the plurality of candidate browsing paths based on the importance calculated.

According to another aspect of the invention, there is provided a method for browsing data, comprising: generating at least one browsing path according to the method of generating browsing path for data; and browsing the data along the at least one browsing path.

According to another aspect of the invention, there is provided an apparatus of generating browsing path for data, comprising: a candidate path generating unit configured to generate a plurality of candidate browsing paths based on a data model describing the structure of the data; an importance calculating unit configured to, for each of the plurality of candidate browsing paths, calculate importance of the browsing path based on a portion of data corresponding to the browsing path in the data; and a path selecting unit configured to select at least one of the plurality of candidate browsing paths based on the importance calculated.

According to another aspect of the invention, there is provided a computer program product for causing a computer to perform the above method.

BRIEF DESCRIPTION OF THE DRAWINGS

It is believed that the above features, advantages and objects of the invention will be better understood from the description of the detailed implementation of the invention in conjunction with accompany drawings, in which:

FIG. 1 is an example of generating browsing path for data according to the prior art;

FIG. 7 is an example of a selected browsing path according to an embodiment of the invention;

DETAILED DESCRIPTION OF THE PREFERRED EMBODIMENTS

Various embodiments of the invention will be described in detail in conjunction with accompany drawings as following.

Figure 2:
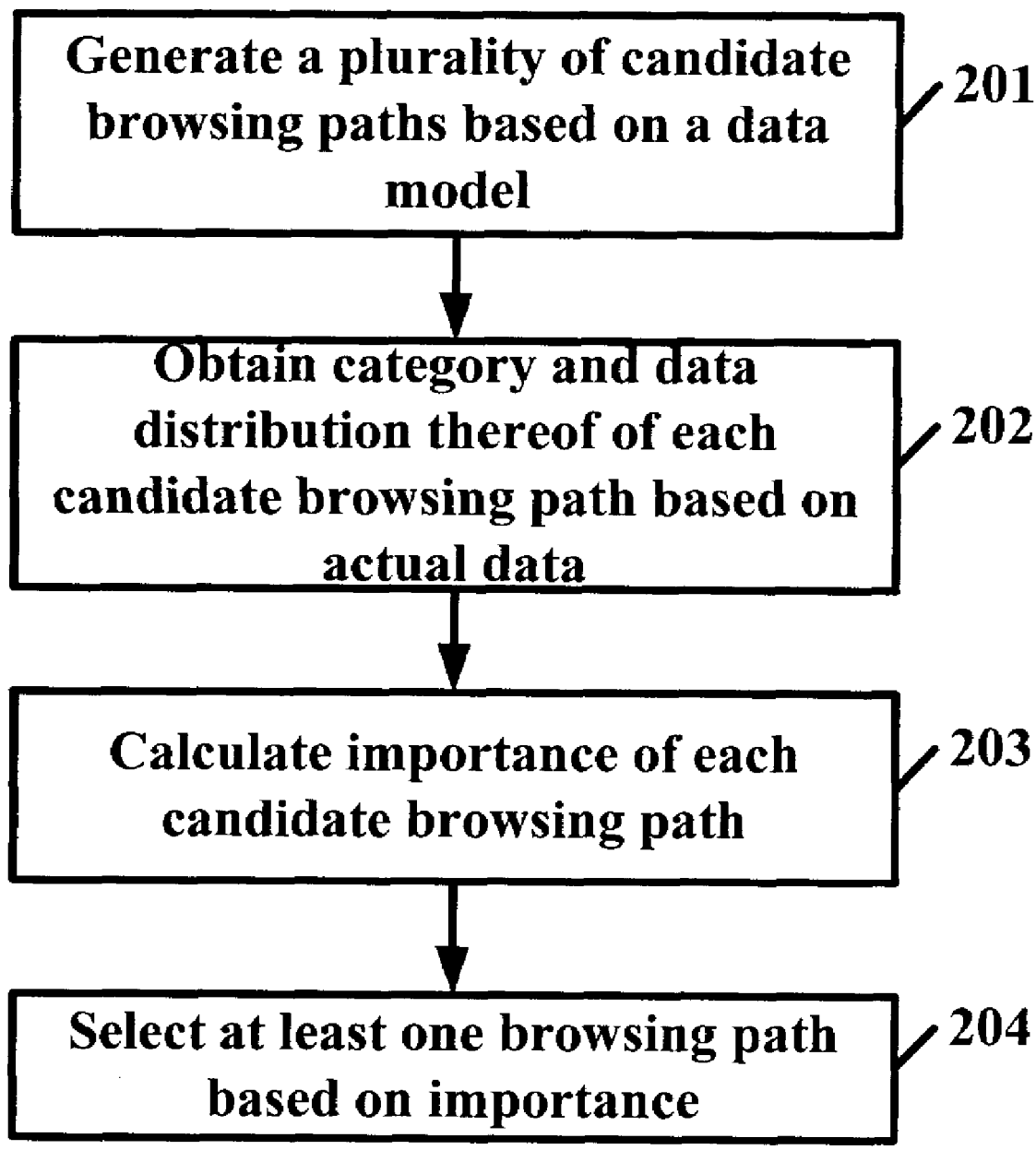
FIG. 2 is a flowchart of the method of generating browsing path for data according to one embodiment of the invention.

FIG. 2 is a flowchart of the method of generating browsing path for data according to one embodiment of the invention. As shown in FIG. 2, first at step 201, a plurality of candidate browsing paths is generated based on a data model describing the structure of the data.

In the present embodiment, the data model refers to a model that describes the structure of the data, which can include objects, object's properties and objects' relationships, and can be a conceptual model, for example, Unified Modeling Language (UML) model, Extensible Markup Language (XML) model, Entity/Relation (E/R) model, Ontology model or any combination thereof. The object in the data model is the abstract definition of the entities in that data model. For example, the Oriented Object or Ontology paradigm Objects can be represented by classes. As the presentation structure (e.g., object, relationship, constraint, etc.) of a new view becomes more and more abundant, the business objects tend to be more and more complex.

A browsing path refers to a particular view on the current dataset, which is similar to the concept of facets. It is more generic than the concept of facet since a browsing path may be a complex path defined by object's property, relationship, possible type and combinations thereof.

Figure 3:
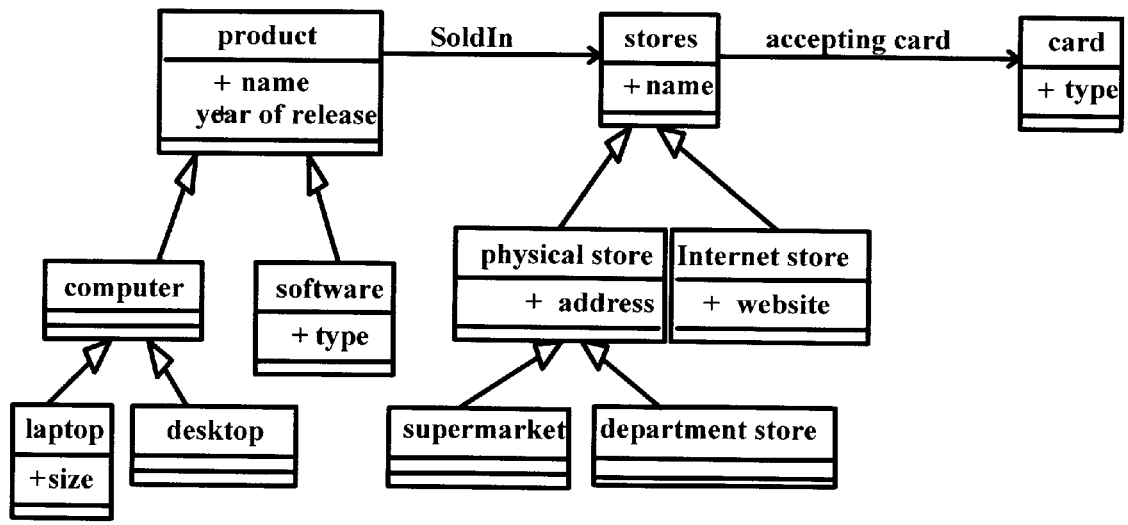
FIG. 3 is an example of a data model according to the embodiment of the invention.

FIG. 3 shows one example of a UML model as the data model. As shown in FIG. 3, the objects include product, store and credit card. Product's property includes name and year of release, and the product further includes a hierarchy of subclass: computer and software. The relationship between the product and store is sold in, and the relationship between the store and credit card is accepting card.

For the above data model, the content that can be used to generate a candidate browsing path includes, but not limited to:

(1) If the object is part of a hierarchy, then this hierarchy is a candidate browsing path, for example, a product hierarchy, a store hierarchy, etc.

(2) Object's property, for example, product's name, year of release, etc.

(3) Relationship between objects, for example, sold in (store)—name, and combination of relations such as: sold in (store)—accepting card (card)—type, etc.

Figure 4:
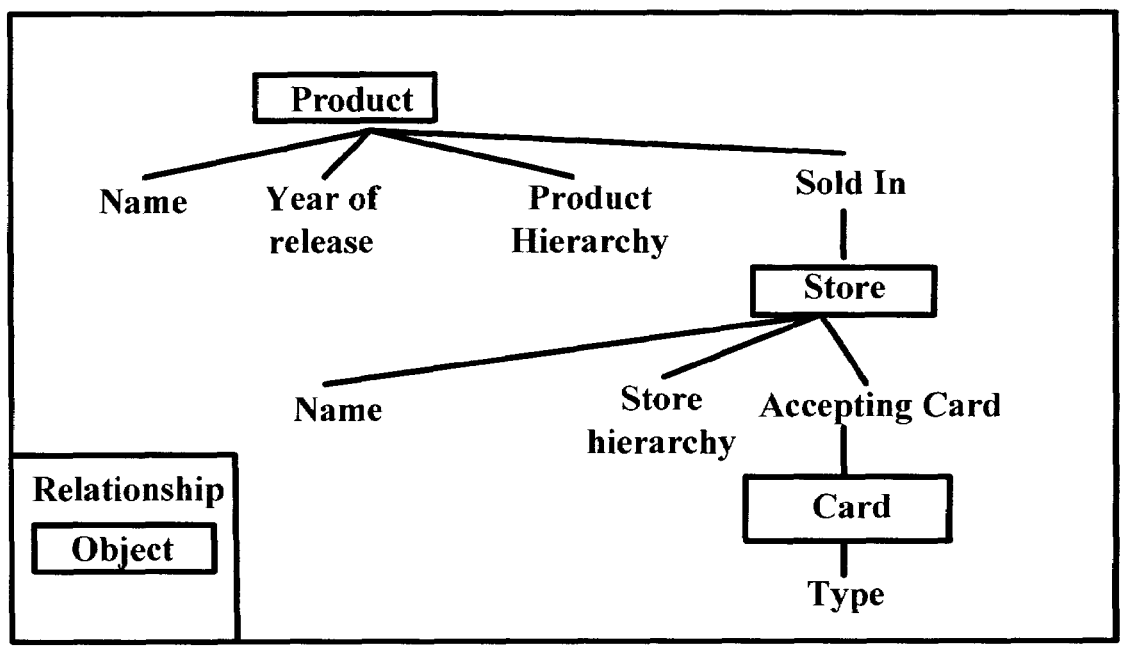
FIG. 4 is an example of the tree structure of candidate browsing paths according to the embodiment of the invention.

At step 201, by traversing each object in the data model, a candidate browsing path is generated based on each property of the object, each relationship of the object with another objects, and based on the hierarchy of the object. FIG. 4 shows an example of a graph of such candidates paths.

Specifically, for example, the following manner can be employed: first a graph is constructed based on the data model, the node in the graph is the class (or concept) and property in the data model. A directed edge is formed from a class to the property on the class, and the relationship between two classes forms two directed edges. Then, starting from one point, obtain a subset of all paths from that point to all the other points by using an existing graph traversing algorithm (for example, see "Introduction to Algorithms, Second Edition", by Thomas H. Cormen, Charles E. Leiserson, Ronald L. Rivest, and Clifford Stein, published by The MIT Press, 2001), and the paths in that subset are used as candidate paths.

There are various methods to filter this subset, such as limiting the length of the path or limiting the number of times a node repeated in the path (this method is very effective when dealing with a model with large and complex data structure, since in a complex data structure, a dead loop is very likely to happen, that is, one class points to another class via one directed edge, while another class in turn points back to that class via other directed edges, the occurrence of such dead loop can be easily avoided if the number of times a node repeated in the path is limited) etc. It will be appreciated that the invention is not limited to certain filtering methods, and even filtering on the subset is not a necessity, since in a simple data model's structure, the range of the browsing path that can be selected itself is very limited, so there is no need to apply more restrictions, simply all the candidate browsing paths are found out for the subsequent importance comparison.

Specifically, for example, the list of candidate browsing paths generated for a product is shown in Table 1.

TABLE 1

| Candidate browsing paths for Product: |
| --- |
| Product Hierarchy |
| Name |
| Year of release |
| Sold In (Store) - Store Name |
| Sold In (Store) - Store Hierarchy |
| Sold In (Store) - Accepting Card (Card) - Type |

Ex: For "Sold In", there are three sub-paths.

Next, at step 202, categories and data distributions thereof corresponding to each candidate browsing path are obtained based on the actual data. Specifically, for each of the candidate browsing paths, the data is retrieved based on the browsing path, and at least one possible category and data distribution thereof corresponding to the browsing path is obtained based on the obtained searching result, wherein the data distribution of the category in the present embodiment is represented as, for example, the number of hits in the searching result. Here, the actual data is the dataset described by the above mentioned data model, it can be for instance raw files, XML files, database content or ontology instances. For the above candidate browsing path, the possible category corresponding thereto includes, but not limited to:

(1) If the candidate browsing path is a hierarchy, the possible category corresponding thereto can be a subclass of the hierarchy. For example, if the browsing path is a product hierarchy, the category corresponding thereto is the subclass of the product hierarchy: computer and software.

(2) If the candidate browsing path is the property of an object, the possible category corresponding thereto can be:

(i) If the property is an enumerated type, the possible category corresponding thereto can be the enumerated values of the property. For example, if the browsing path is a credit card type, the category corresponding thereto is Visa, MasterCard, etc.

(ii) If the property is a value, the possible category corresponding thereto can include a set of value ranges obtained by clustering a plurality of actual values in the searching result. For example, if the browsing path is the price of a product, the category corresponding thereto is, for example, <$15, between $15 and $30, more than $30, etc.

The present invention has no specific limitation on the manner in which the clustering is performed, as long as multiple discrete values in the searching result can be clustered into a set of value ranges. The detailed clustering method is described, for example, in the article "Survey Of Clustering Data Mining Techniques" by Pavel Berkhin, 2002 Accrue Software, and in article "Data mining tasks and methods: Clustering: numerical clustering" by Padhraic Smyth, Handbook of data mining and knowledge discovery, p 386-388, 2002 Oxford University Press, Inc. (ISBN:0-19-511831-6), all of which are incorporated herein by reference.

(iii) If the value of the property is a discrete value, the category corresponding thereto can be the actual value of the property. For example, if the property is year of release for the product, the category corresponding thereto is the actual value of the year of release, e.g. 2002, 2003, 2004 etc.

Next, at step 203, the importance of each candidate browsing path is calculated based on a portion of data corresponding to the browsing path in the actual data. Specifically, in the present embodiment, the importance of the browsing path is calculated based on data distribution of various categories corresponding to the browsing path and the depth of the browsing path, however, the present invention is not limited to this method. Here, the importance of the browsing path represents the quantity of information carried by that browsing path; a high importance means this browsing path carries lot of information, so it is a good candidate for browsing the data.

Specifically, in the present embodiment, the data distribution is evaluated with entropy. First, based on the data distribution of various categories corresponding to the browsing path, that is, based on the number of hits of various categories in the searching result, a hit probability of each category in the searching result is calculated, for example, the probability $p_i$ of the $i^{th}$ category is calculated.

Figure 5:
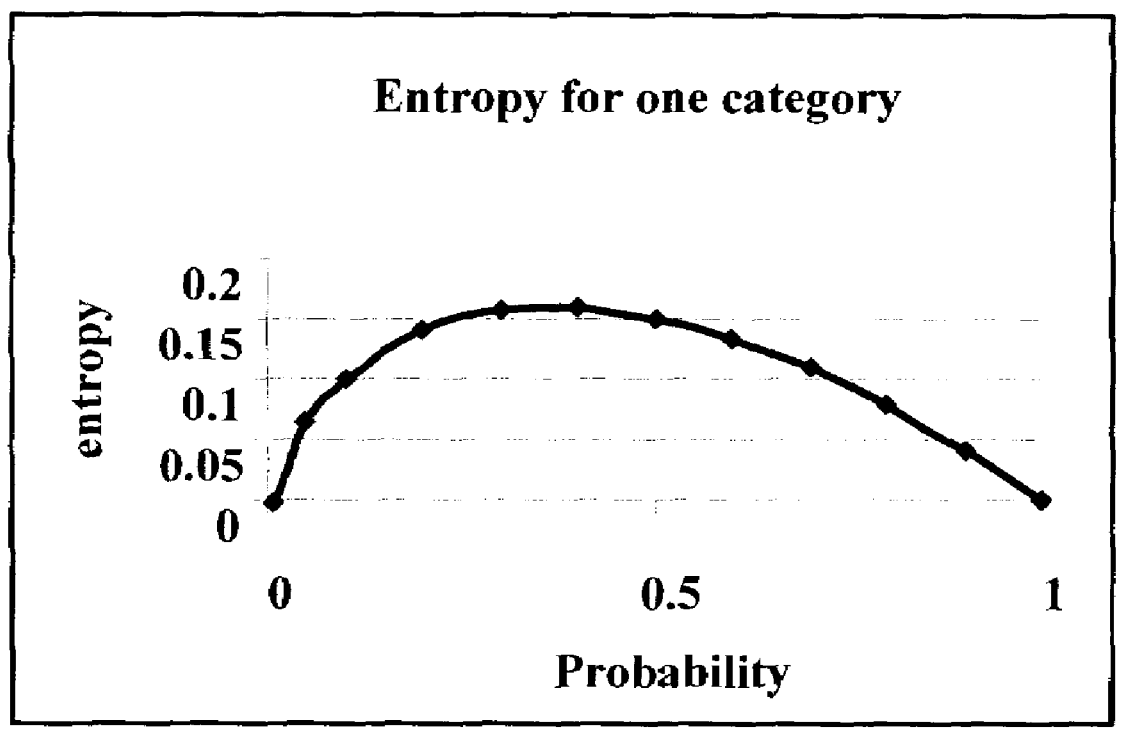
FIG. 5 is a plot of the entropy of one category according to the embodiment of the invention.

Then, based on the calculated probability $p_i$ of the $i^{th}$ category, the entropy of the $i^{th}$ category is calculated with formula (1):

$$-p_i \cdot \log(p_i) \quad (1)$$

the plot of the calculated entropy of the $i^{th}$ category is shown in FIG. 5, wherein if $p_i=0$, the hit probability of the $i^{th}$ category in the searching result is 0, i.e., the category does not exist, then the entropy of the category is 0. If $p_i=1$, the hit probability of the $i^{th}$ category in the searching result is 1, i.e., there is only one category, then the entropy of the category is also 0.

Figure 6:
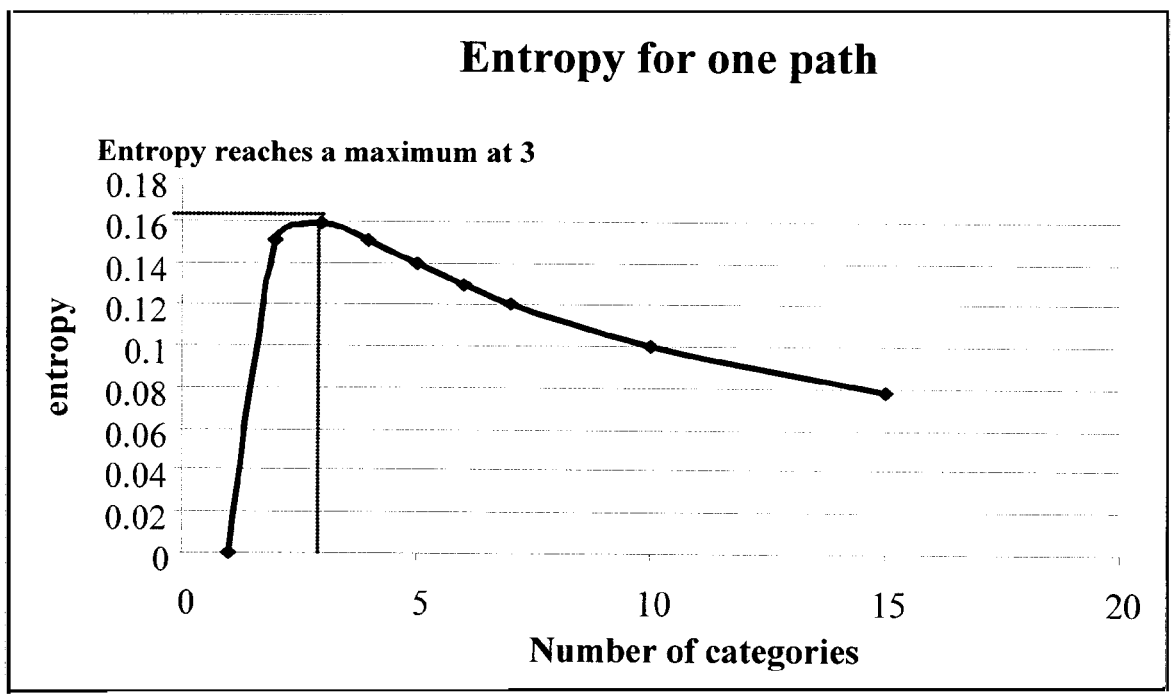
FIG. 6 is a plot of the entropy of one path according to the embodiment of the invention.

Next, the average entropy of the browsing path is calculated with formula (2):

$$\frac{\sum_{i \in N} -p_i \cdot \log(p_i)}{N} \quad (2)$$

wherein, N is the number of categories corresponding to the browsing path. The calculated average entropy with balanced category of the browsing path is shown in FIG. 6, wherein, if there is only one category corresponding to the browsing path, then the average entropy of the browsing path is 0, indicating that browsing path is meaningless. In FIG. 6, the average entropy of the browsing path reaches a maximum at 3 categories, indicating that three is most appropriate for the categories corresponding to a browsing path.

Then, based on the calculated average entropy of the browsing path, the importance of the browsing path is calculated with formula (3):

$$R = \frac{\sum_{i \in N} -p_i \cdot \log(p_i)}{N} \cdot \lambda^d \quad (3)$$

wherein, R is the importance of the browsing path, d is the depth of the browsing path, $\lambda$ is a coefficient (attenuation coefficient) between 0 and 1, e.g., 0.8. The degree of importance of the path can be controlled by the attenuation based on the depth of the path. Generally, it is hard for a user to understand a path if it is too long, therefore, the larger the depth of the path, the lower the importance, and the smaller the depth, the higher the importance. Accordingly, $\lambda$ is set based on actual needs. The larger the value of $\lambda$, the slower the attenuation, the smaller the effect of the depth of path on the degree of importance, and the path can be longer; the smaller the value of $\lambda$, the faster the attenuation, the larger the effect of the depth of path on the degree of importance, and the path can not be too long. It can be appreciated by those skilled in the art that the value of $\lambda$ can be set based on user's needs, the degree of complexity of the structure of a data model to be searched. For example, the value of $\lambda$ can be set higher when processing the structure of a complex data model, and the value of $\lambda$ can be set lower when processing the structure of a simple data model.

In addition, according to another embodiment of the invention, the importance of each candidate browsing path may also be calculated based on the maximum probability $p_{max}$ and the minimum probability $p_{min}$ of the category corresponding to the browsing path, that is, the smaller the difference between the maximum probability $p_{max}$ and the minimum probability $p_{min}$, the higher the importance of the browsing path, for example, the importance can be calculated with formula (4):

$$R = \frac{1}{p_{max} - p_{min}} \quad (4)$$

wherein, R is the importance of the browsing path, $p_{max}$ is the maximum value of probability of the category corresponding to the browsing path, $p_{min}$ is the minimum value of probability of the category corresponding to the browsing path. In the embodiment, the smaller the difference between the maximum probability $p_{max}$ and the minimum probability $p_{min}$, the higher the importance R of the browsing path. In a very unusual condition, the difference between $p_{max}$ and $p_{min}$ can be zero, thus, as a revision, formula (4) can be revised as the following formula (4'):

$$R = \frac{1}{(p_{max} - p_{min}) + \alpha} \quad (4')$$

wherein $\alpha$ is a revision to the denominator, generally, $\alpha$ can be a very small value, e.g. 0.0001, to prevent the resulting R to be infinitely great.

In addition, in another alternative embodiment, the importance of each candidate browsing path may be calculated based on the number of categories corresponding to the browsing path and the depth of the browsing path, that is, the closer the number of categories to the desired value and the smaller the depth, the higher the importance of the browsing path, for example, the importance can be calculated with formula (5):

$$R = \frac{1}{(|N-k|+1)d} \quad (5)$$

wherein, R is the importance of the browsing path, N is the number of categories corresponding to the browsing path, d is depth of the browsing path, k is the desired number of categories. In the embodiment, the closer the number N of categories corresponding to the browsing path to the desired number k of categories, the higher the importance R of the browsing path, and the smaller the depth d of the browsing path, the higher the importance R of the browsing path.

It can be appreciated by those skilled in the art that the invention is not limited to the above three calculating methods, other schemes that can represent the importance of the browsing path may also be employed based on actual needs.

Finally, at step 204, the plurality of candidate browsing paths are ranked based on the importance calculated at step 203, so as to select at least one browsing path as the final resulting browsing path.

Specifically, as shown in FIG. 7, there are illustrated browsing paths generated for the product. In FIG. 7, there are four browsing paths and their corresponding categories, and the data distribution of each category.

In FIG. 7, the first browsing path "product hierarchy" includes three classes "computer-desktop", "computer-laptop" and "software", their number of hits are 123, 123 and 120, their probability of hits calculated are 0.3361, 0.3361 and 0.3279, their entropy calculated with formula (1) are 0.1592, 0.1592 and 0.1588, respectively, and the average entropy of the first browsing path calculated with formula (2) is 0.159. The depth d of the first path is 1, taking $\lambda$ as 0.8, so the importance of the first browsing path calculated with formula (3) is $R=0.159*0.8^1=0.1272$.

The second browsing path "year of release" includes three classes "2002", "2003" and "2004", their number of hits are 200, 230 and 253, their probability of hits calculated are 0.2928, 0.3367 and 0.3704, their entropy calculated with formula (1) are 0.1562, 0.1592 and 0.1598, respectively, and the average entropy of the second browsing path calculated with formula (2) is 0.1584. The depth d of the second path is 1, taking $\lambda$ as 0.8, so the importance of the second browsing path calculated with formula (3) is $R=0.10584*0.8^1=0.1267$.

The third browsing path "sold in (store)-hierarchy" includes three classes "internet store", "physical store-supermarket" and "physical store-department store", their number of hits are 400, 160 and 123, their probability of hits calculated are 0.5857, 0.2343 and 0.1801, their entropy calculated with formula (1) are 0.1361, 0.1477 and 0.1341, respectively, and the average entropy of the third browsing path calculated with formula (2) is 0.1393. The depth d of the third path is 2, taking $\lambda$ as 0.8, so the importance of the third browsing path calculated with formula (3) is $R=0.1393*0.8^2=0.0891$.

The fourth browsing path "sold in (store)-accepting card (card)" includes two classes "Visa", and "MasterCard", their number of hits are 450, and 200, their probability of hits calculated are 0.6923, and 0.3077, their entropy calculated with formula (1) are 0.1106, and 0.1575, respectively, and the average entropy of the fourth browsing path calculated with formula (2) is 0.134. The depth d of the fourth path is 3, taking $\lambda$ as 0.8, so the importance of the fourth browsing path calculated with formula (3) is $R=0.134*0.8^3=0.0686$.

So the browsing path can be selected based on the value of the calculated importance and the selected browsing path can be displayed to a user. It should be noted that while four browsing paths with relatively high importance are finally shown in the embodiment of the invention, the invention is not so limited, any number of paths or one path with relatively high importance can be displayed based on user or system's setting, for example, selecting the first 5 paths with relatively high importance.

From the above description it can be seen that since the method of generating browsing path for data of the present embodiment can select a browsing path based on data model and actual data distribution, there is no need to select a browsing path manually, so a preferred browsing path can be found for user, and only the preferred browsing path, that is, the browsing path with the highest importance, is displayed to the user.

Figure 8:
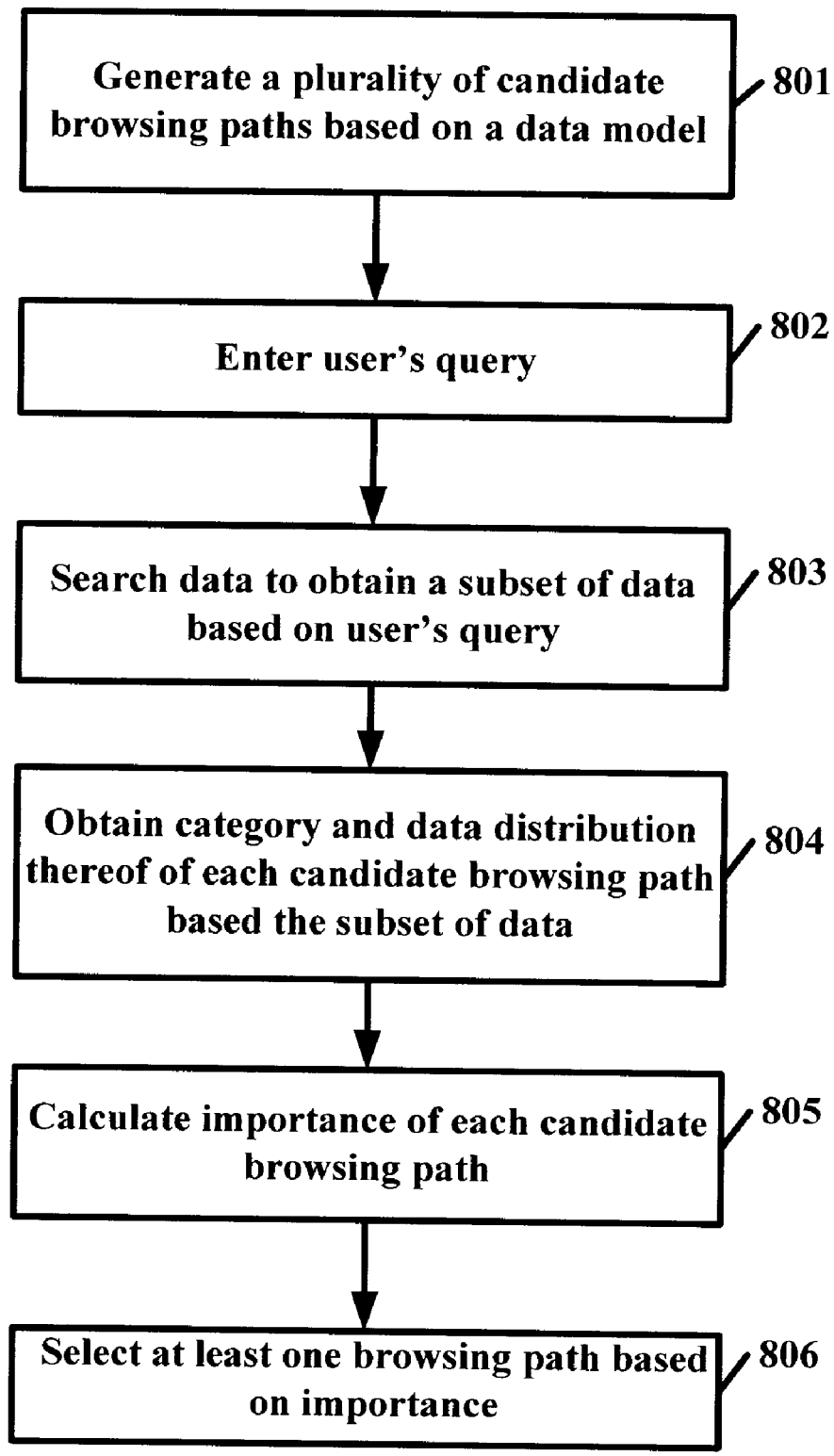
FIG. 8 is a flowchart of the method of generating browsing path for data according to another embodiment of the invention.

Under the same inventive conception, FIG. 8 is a flowchart of the method of generating browsing path for data according to another embodiment of the invention. Next, the embodiment will be described in conjunction with FIG. 8. For those same part as the above embodiment, the description of which will be properly omitted.

As shown in FIG. 8, first at step 801, a plurality of candidate browsing paths are generated based on a data model describing the structure of the data.

The data model can include objects, object's properties and objects' relationships, it can be the above conceptual model, for example, UML model, XML model, E/R model, Ontology model or any combination thereof.

FIG. 3 shows one example of a UML model as the data model. As shown in FIG. 3, the objects include product, store and credit card. Product's property includes name and year of release, and the product further includes a hierarchy of subclass: computer and software. The relationship between the product and store is sold in, and the relationship between the store and credit card is accepting card.

For the above data model, the content that can be used to generate a candidate browsing path includes, but not limited to:

(1) If the object is part of a hierarchy, then this hierarchy is a candidate browsing path, for example, a product hierarchy, a store hierarchy, etc.

(2) Object's property, for example, product's name, year of release, etc.

(3) Relationship between objects, for example, sold in (store)—name, sold in (store)—accepting card (card)—type, etc.

At step 801, by traversing each object in the data model, a candidate browsing path is generated based on the property of the object and the relationship of the object with another object, and a candidate browsing path is generated based on the hierarchy of the object, as shown in FIG. 4.

Specifically, for example, the list of candidate browsing paths generated for the product is shown in Table 1.

Next, at step 802, a user's query is entered. The query may be, for example, one or more key words the user wish to search or other forms of query; the invention has no specific limitation to this.

Next, at step 803, the data is searched based on the entered user's query and a subset of data is obtained. The present invention has no particular limitation to how to search data based on user's query to obtain a subset of data, all the existing and future manners that can accomplish the above object can be used.

Next, at step 804, the category and data distribution thereof corresponding to each candidate browsing path is obtained based on the searched subset of data. Specifically, for each of the candidate browsing paths, the subset of data is searched based on the browsing path, and at least one possible category and data distribution thereof corresponding to the browsing path is obtained based on the obtained searching result, wherein the data distribution of the category in the present embodiment is represented as, for example, the number of hits in the searching result. For the above candidate browsing path, the possible category corresponding thereto includes, but not limited to:

(1) If the candidate browsing path is a hierarchy, the possible category corresponding thereto can be a subclass of the hierarchy. For example, if the browsing path is a product hierarchy, the category corresponding thereto is the subclass of the product hierarchy: computer and software.

(2) If the candidate browsing path is the property of an object, the possible category corresponding thereto can be:
  (i) If the property is an enumerated type, the possible category corresponding thereto can be the enumerated values of the property. For example, if the browsing path is a credit card type, the category corresponding thereto is Visa, MasterCard, etc.
  (ii) If the property is a value, the possible category corresponding thereto can include a set of value ranges obtained by clustering a plurality of actual values in the searching result, the method of clustering is the same as that of the embodiment described with reference to FIG. 2. For example, if the browsing path is the price of a product, the category corresponding thereto is, for example, <$15, between $15 and $30, more than $30, etc.
  (iii) If the value of the property is a discrete value, the category corresponding thereto can be the actual value of the property. For example, if the property is year of release for the product, the category corresponding thereto is the actual value of the year of release, e.g. 2002, 2003, 2004 etc.

Next, at step 805, the importance of each candidate browsing path is calculated based on a portion of data corresponding to the browsing path in the actual data. Specifically, in the present embodiment, the importance of the browsing path is calculated based on data distribution of various categories corresponding to the browsing path and the depth of the browsing path. The detailed method of calculating importance is the same as that of the embodiment described with reference to FIG. 2 and will not be described herein for brevity.

Finally, at step 806, the plurality of candidate browsing paths are ranked based on the importance calculated at step 805, so as to select at least one browsing path as the final resulting browsing path.

From the above description it can be seen that since the method of generating browsing path for data of the present embodiment can select a browsing path based on data model and actual data distribution, there is no need to select a browsing path manually, so a preferred browsing path can be found for user, and only the preferred browsing path, that is, the browsing path with the highest importance, is displayed to the user.

In addition, the method of generating browsing path for data of the present embodiment can search a subset of data based on user's query and calculate importance of the browsing path based on the subset of data, so as to generate more precisely a preferred browsing path for the user.

As a variation to the present embodiment, after generating a browsing path, the user can further enter a query and further search a subset of data based on that query, so as to obtain a more precise browsing path. Moreover, the above method step can be performed repeatedly, until the user obtains a satisfactory browsing path.

A more precise browsing path can be generated for the user through the method of generating browsing path for data of the varied embodiment.

In addition, the embodiment shown in FIG. 8 can be implemented in conjunction with the embodiment described in the foregoing FIG. 2, when there is no query entered by the user, first the embodiment shown in FIG. 2 is used to provide the browsing path for the user based on all the data, then, when the user has entered a query, the embodiment shown in FIG. 8 and its variation are used to continually narrow the range of the subset of data, so as to provide more specific browsing path for the user.

Figure 9:
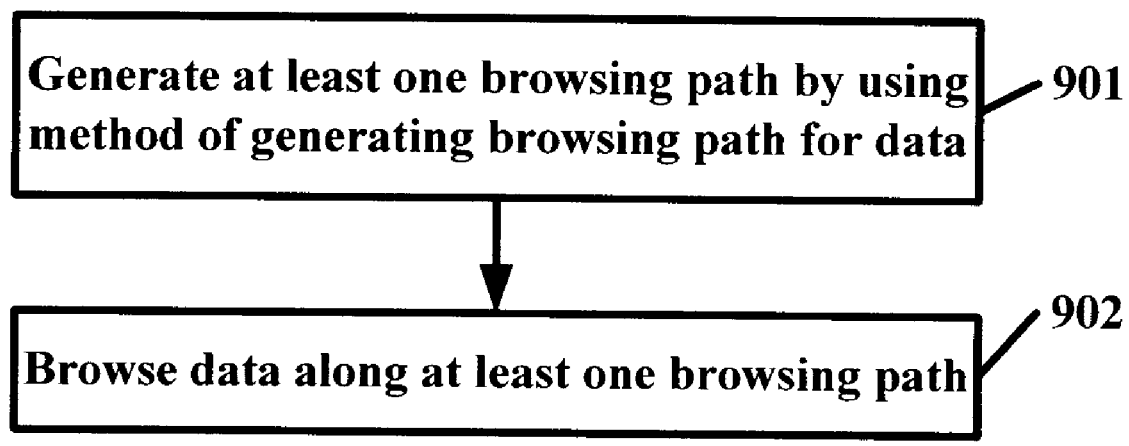
FIG. 9 is a flowchart of the method for browsing data according to another embodiment of the invention.

Under the same inventive conception, FIG. 9 is a flowchart of the method for browsing data according to another embodiment of the invention. Next, the embodiment will be described in conjunction with FIG. 9. For those same part as the above embodiment, the description of which will be properly omitted.

As shown in FIG. 9, first at step 901, at least one browsing path, for example, the browsing path shown in FIG. 7, is generated by using the method of generating browsing path for data described in the foregoing embodiments.

Next, at step 902, the user browses the data along the selected browsing path.

With the method for browsing data of the present embodiment, a browsing path can be selected based on data model and actual data distribution, there is no need to select a browsing path manually, and only the preferred browsing path, that is, the browsing path with the highest importance, is displayed to the user, so the efficiency of browsing data is improved.

In addition, the method for browsing data of the present embodiment can search a subset of data based on user's query and calculate importance of the browsing path based on the subset of data, so as to generate more precisely a preferred browsing path for the user, which further improves the efficiency of browsing data.

Figure 10:
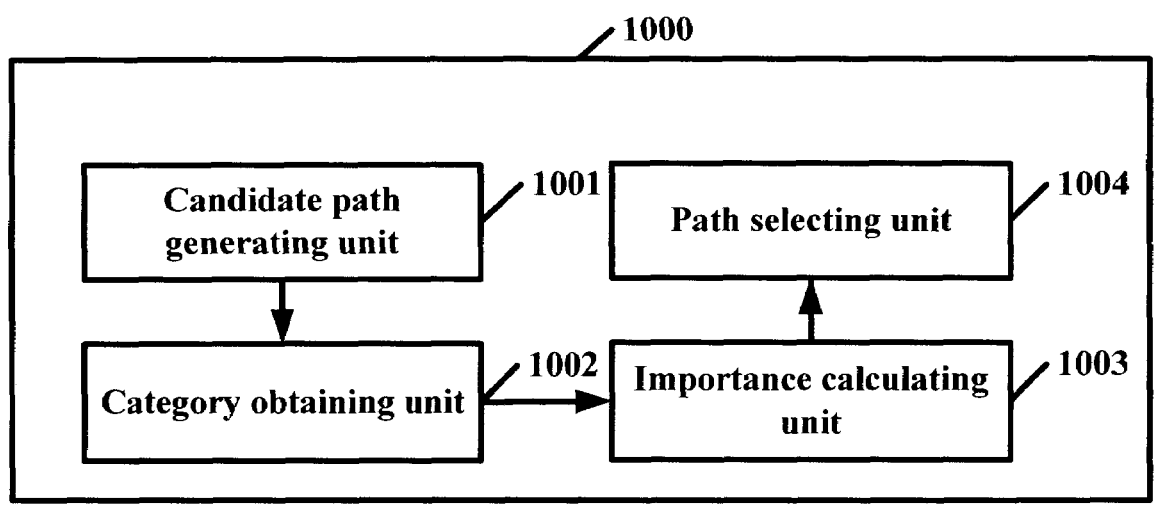
FIG. 10 is a block diagram of the apparatus of generating browsing path for data according to another embodiment of the invention.

Under the same inventive conception, FIG. 10 is a block diagram of the apparatus of generating browsing path for data according to another embodiment of the invention. Next, the embodiment will be described in conjunction with FIG. 10. For those same part as the above embodiment, the description of which will be properly omitted.

In FIG. 10, the apparatus 1000 of generating browsing path for data comprising: a candidate path generating unit 1001 configured to generate a plurality of candidate browsing paths based on a data model describing the structure of the data; a category obtaining unit 1002 configured to obtain at least one possible category and data distribution thereof corresponding to a specified browsing path based on the data; an importance calculating unit 1003 configured to obtain at least one possible category and data distribution thereof corresponding to each browsing path by using the category obtaining unit 1002 and calculate importance of the browsing path; and a path selecting unit 1004 configured to select at least one of the plurality of candidate browsing paths based on the calculated importance.

Optionally, the apparatus 1000 of generating browsing path for data further comprises a searching unit configured to search a subset of data from the data according to user's query, wherein the category obtaining unit 1002 obtains at least one possible category and data distribution thereof corresponding to the browsing path based on the subset of data.

The data model used in the apparatus 1000 of generating browsing path for data of the present embodiment can include objects, object's properties and objects' relationships, and it can be a conceptual model, for example, UML model, XML model, E/R model, Ontology model or any combination thereof.

FIG. 3 shows one example of a UML model as the data model. As shown in FIG. 3, the objects include product, store and credit card. Product's property includes name and year of release, and the product further includes a hierarchy of subclass: computer and software. The relationship between the product and store is sold in, and the relationship between the store and credit card is accepting card.

For the above data model, the content that can be used to generate a candidate browsing path includes, but not limited to:

(1) If the object is part of a hierarchy, then this hierarchy is a candidate browsing path, for example, a product hierarchy, a store hierarchy, etc.

(2) Object's property, for example, product's name, year of release, etc.

(3) Relationship between objects, for example, sold in (store)—name, sold in (store)—accepting card (card)—type, etc.

The candidate path generating unit 1001 of the above apparatus 1000 of generating browsing path for data, by traversing each object in the data model, generates a candidate browsing path based on a property of the object and a relationship of the object with another object, and generates a candidate browsing path based on a hierarchy of the object, as shown in FIG. 4.

Specifically, for example, a candidate browsing path generated for the product is shown in Table 1.

Optionally, the category obtaining unit 1002 comprises a path searching unit configured to search the data according to the browsing path; wherein, the category obtaining unit 1002 obtains at least one possible category based on the searching result.

Specifically, for each of the plurality of candidate browsing paths, the possible category corresponding thereto includes, but not limited to:

(1) If the candidate browsing path is a hierarchy, the possible category corresponding thereto can be a subclass of the hierarchy. For example, if the browsing path is a product hierarchy, the category corresponding thereto is the subclass of the product hierarchy: computer and software.

(2) If the candidate browsing path is the property of an object, the possible category corresponding thereto can be:

(i) If the property is an enumerated type, the possible category corresponding thereto can be the enumerated values of the property. For example, if the browsing path is a credit card type, the category corresponding thereto is Visa, MasterCard, etc.

(ii) If the property is a value, the possible category corresponding thereto can include a set of value ranges obtained by clustering a plurality of actual values in the searching result, the method of clustering is the same as that of the embodiment described with reference to FIG. 2. For example, if the browsing path is the price of a product, the category corresponding thereto is, for example, <$15, between $15 and $30, more than $30, etc.

(iii) If the value of the property is a discrete value, the category corresponding thereto can be the actual value of the property. For example, if the property is year of release for the product, the category corresponding thereto is the actual value of the year of release, e.g. 2002, 2003, 2004 etc.

Optionally, the importance calculating unit 1003 calculates the importance of the browsing path based on data distribution of various categories corresponding to the browsing path and the depth of the browsing path.

Specifically, the importance calculating unit 1003 first calculates the hit probability of each category in the searching result based on the data distribution of various categories corresponding to the browsing path, that is, based on the number of hits of various categories in the searching result, for example, calculates the probability $p_i$ of the $i^{th}$ category.

Then, based on the calculated probability $p_i$ of the $i^{th}$ category, the entropy of the $i^{th}$ category is calculated with the above formula (1). The plot of the calculated entropy of the $i^{th}$ category is shown in FIG. 5, wherein if $p_i=0$, the hit probability of the $i^{th}$ category in the searching result is 0, i.e., the category is not exist, then the entropy of the category is 0. If $p_i=1$, the hit probability of the $i^{th}$ category in the searching result is 1, i.e., there is only one category, then the entropy of the category is also 0.

Next, the average entropy of the browsing path is calculated with the above formula (2). The calculated average entropy of the browsing path is shown in FIG. 6, wherein, if there is only one category corresponding to the browsing path, then the average entropy of the browsing path is 0, indicating that browsing path is meaningless. In FIG. 6, the average entropy of the browsing path reaches a maximum at 3 categories, indicating that three is most appropriate for the categories corresponding to a browsing path.

Finally, the importance of the browsing path is calculated with the above formula (3) based on the calculated average entropy of the browsing path.

In addition, the importance calculating unit 1003 can calculate the importance of the browsing path based on the maximum probability $p_{max}$ and the minimum probability $p_{min}$ of the category corresponding to the browsing path, that is, the smaller the difference between the maximum probability $p_{max}$ and the minimum probability $p_{min}$, the higher the importance of the browsing path, for example, the importance of the browsing path can be calculated with the above formula (4').

In addition, the importance calculating unit 1003 can calculate the importance of the browsing path based on the number of categories corresponding to the browsing path and the depth of the browsing path, that is, the closer the number of categories to the desired value and the smaller the depth, the higher the importance of the browsing path, for example, the importance of the browsing path can be calculated with the above formula (5).

The path selecting unit 1004 can select one or more browsing paths as the final generated browsing path based on the importance calculated by the importance calculating unit 1003.

From the above description it can be seen that since the apparatus 1000 of generating browsing path for data of the present embodiment can automatically generate a browsing path based on data model and select a candidate browsing path based on actual data distribution, there is no need to select a browsing path manually, and only a preferred browsing path, that is, the browsing path with the highest importance, is taken as the final generated browsing path, so that a preferred browsing path can be found for the user.

In addition, the apparatus 1000 of generating browsing path for data of the present embodiment can search a subset of data based on user's query and calculate importance of the browsing path based on the subset of data, so as to generate more precisely a preferred browsing path for the user.

The apparatus 1000 of generating browsing path for data of the present embodiment and its components can be implemented with hardware circuit, for example, Very Large Scale Integrate Circuit or gate array, semiconductor devices such as logical chip, transistor, or programmable hardware device such as Field Programmable Gate Array, programmable logical device, etc., or can be implemented with software executing on various types of processors, or be implemented with a combination of the hardware circuit and software.

The present invention further provides a computer program product, and when loaded into a computer, the program product will cause the computer to perform the method of generating browsing path for data and the method for browsing data.

Although a method and apparatus of generating browsing paths for data, a method for browsing data and a computer program product of the present invention has been described in detail through some exemplary embodiments, these embodiments are not exhaustive, various variations and modifications can be made therein by those skilled in the art without departing from the spirit and scope of the invention. Therefore, the present invention is not limited to these embodiments, the scope of which is only defined by accompany claims.

What is claimed is:

1. A method comprising:
generating a plurality of candidate browsing paths from data based on a data model describing the structure of said data;
calculating relative importance of said plurality of candidate browsing paths, based on at least a portion of said data corresponding to said candidate browsing paths;
ranking said plurality of candidate browsing paths based on their calculated relative importance; and
displaying to a user at least one of said plurality of candidate browsing paths that is selected based on said ranking,
wherein calculating said relative importance of said candidate browsing paths is performed by using the following formula:

$$R = ((\Sigma(i \in N)(-p_i \cdot \log(p_i)))/N) \cdot \lambda^d$$

wherein R denotes said relative importance of said candidate browsing path, i denotes an $i^{th}$ category corresponding to said candidate browsing path, $p_i$ denotes a probability of said $i^{th}$ category occurring in said data, N denotes the number of categories corresponding to said candidate browsing path, $\Sigma(i \in N)(-p_i \cdot \log(p_i))$ denotes an entropy of said candidate browsing path, d denotes a depth of said candidate browsing path, and $\lambda$ denotes a constant between 0 and 1.

2. The method according to claim 1, wherein calculating said relative importance of said candidate browsing path comprises:
obtaining at least one possible category and data distribution thereof corresponding to said candidate browsing path based on said data; and
calculating said relative importance of said candidate browsing path using said formula based on said at least one possible category and data distribution thereof corresponding to said candidate browsing path.

3. The method according to claim 2, comprising searching a subset of data from said data according to a user's query, wherein said obtaining at least one possible category corresponding to said candidate browsing path comprises obtaining at least one possible category and data distribution thereof corresponding to said candidate browsing path based on said subset of data.

4. The method according to claim 1, wherein said data model is a conceptual model.

5. The method according to claim 1, wherein said data model comprises a plurality of objects, objects' properties and objects' relationships, and said generating a plurality of candidate browsing paths comprises traversing one or more objects of said data model, and generating a candidate browsing path based on a property of said one or more objects and a relationship of said one or more objects with another object.

6. The method according to claim 5, wherein said data model further comprises a hierarchy of said one or more objects, and said generating a plurality of candidate browsing paths further comprises generating a candidate browsing path based on said hierarchy of said one or more objects.

7. The method according to claim 2, wherein said obtaining at least one possible category corresponding to said candidate browsing path comprises:
searching said data based on said candidate browsing path to produce a searching result, and
obtaining said at least one possible category from said searching result.

8. The method according to claim 2, wherein calculating said relative importance of said candidate browsing path comprises calculating the relative importance of said candidate browsing path based on data distribution of said at least one possible category corresponding to said candidate browsing path and a depth of said candidate browsing path.

9. The method according to claim 1, further comprising:
browsing said data along said displayed browsing path that is selected based on said ranking.

10. An apparatus comprising:
a candidate path generating unit configured to generate a plurality of candidate browsing paths from data based on a data model describing the structure of said data;
an importance calculating unit configured to calculate relative importance of said plurality of candidate browsing paths based on at least a portion of said data corresponding to said candidate browsing paths;
a path selecting unit configured to select at least one of said plurality of candidate browsing paths based on said relative importance calculated; and
a display unit displaying said selected browsing path to a user,
wherein said importance calculating unit calculates said relative importance of said candidate browsing paths is performed by using the following formula:

$$R = ((\Sigma(i \in N)(-p_i \cdot \log(p_i)))/N) \cdot \lambda^d$$

wherein R denotes said relative importance of said candidate browsing path, i denotes an $i^{th}$ category corresponding to said candidate browsing path, $p_i$ denotes a probability of said $i^{th}$ category occurring in said data, N denotes the number of categories corresponding to said candidate browsing path, $\Sigma(i \in N)(-p_i \cdot \log(p_i))$ denotes an entropy of said candidate browsing path, d denotes a depth of said candidate browsing path, and $\lambda$ denotes a constant between 0 and 1.

11. The apparatus according to claim 10, further comprising:
a category obtaining unit configured to obtain at least one possible category and data distribution thereof corresponding to a specified browsing path based on said data; and wherein said importance calculating unit obtains at least one possible category and data distribution thereof corresponding to one or more candidate browsing paths with said category obtaining unit and calculates the relative importance of said candidate browsing paths using said formula.

12. The apparatus according to claim 10, further comprising a searching unit configured to search a subset of data from said data according to a user's query, wherein said category obtaining unit obtains at least one possible category and data distribution thereof corresponding to said candidate browsing path based on said subset of data.

13. The apparatus according to claim 10, wherein said data model is a conceptual model.

14. The apparatus according to claim 10, wherein said data model comprises a plurality of objects, objects' properties and objects' relationships, and said candidate path generating unit traverses one or more objects of said data model and generates a candidate browsing path based on a property of said one or more objects and a relationship of said one or more objects with another object.

15. The apparatus according to claim 14, wherein said data model further comprises a hierarchy of said one or more objects, and said candidate path generating unit generates a candidate browsing path based on said hierarchy of said one or more objects.

16. The apparatus according to claim 11, wherein said category obtaining unit comprises:
a path searching unit configured to search said data based on said candidate browsing path to produce a searching result;
wherein said category obtaining unit obtains said at least one possible category from said searching result.

17. The apparatus according to claim 11, wherein said importance calculating unit calculates the relative importance of said candidate browsing path based on data distribution of said category corresponding to said candidate browsing path and a depth of said candidate browsing path.

18. A computer program product having stored thereon a set of instructions that, when being executed by a computer, results in:
generating a plurality of candidate browsing paths based on a data model describing the structure of a data;
calculating relative importance of said plurality of candidate browsing paths, based on at least a portion of said data corresponding to said candidate browsing paths;
selecting at least one of said plurality of candidate browsing paths based on said relative importance calculated; and
displaying said selected browsing path to a user,
wherein calculating said relative importance of said candidate browsing paths is performed by using the following formula:

$$R=((\Sigma(i \in N)(-p_i \cdot \log(p_i)))/N) \cdot \lambda^d$$

wherein R denotes said relative importance of said candidate browsing path, i denotes an $i^{th}$ category corresponding to said candidate browsing path, $p_i$ denotes a probability of said $i^{th}$ category occurring in said data, N denotes the number of categories corresponding to said candidate browsing path, $\Sigma(i \in N)(-p_i \cdot \log(p_i))$ denotes an entropy of said candidate browsing path, d denotes a depth of said candidate browsing path, and $\lambda$ denotes a constant between 0 and 1.

* * * * *